US011233982B2

(12) United States Patent
Nakano

(10) Patent No.: US 11,233,982 B2
(45) Date of Patent: Jan. 25, 2022

(54) DISPLAY CONTROL DEVICE, DISPLAY CONTROL METHOD, AND RECORDING MEDIUM

(71) Applicant: SONY CORPORATION, Tokyo (JP)

(72) Inventor: Satoshi Nakano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,811

(22) PCT Filed: Sep. 4, 2019

(86) PCT No.: PCT/JP2019/034716
§ 371 (c)(1),
(2) Date: Mar. 5, 2021

(87) PCT Pub. No.: WO2020/059486
PCT Pub. Date: Mar. 26, 2020

(65) Prior Publication Data
US 2021/0314544 A1 Oct. 7, 2021

(30) Foreign Application Priority Data
Sep. 18, 2018 (JP) .............................. JP2018-173553

(51) Int. Cl.
*H04N 13/139* (2018.01)
*H04N 13/133* (2018.01)
*H04N 13/344* (2018.01)

(52) U.S. Cl.
CPC ......... *H04N 13/139* (2018.05); *H04N 13/133* (2018.05); *H04N 13/344* (2018.05)

(58) Field of Classification Search
USPC ........................................................ 348/53
See application file for complete search history.

(56) References Cited

U.S. PATENT DOCUMENTS 10,547,832 B2 * 1/2020 Nakashima ............. G06T 5/007
2011/0261169 A1 * 10/2011 Tin ....................... H04N 13/133
348/51

(Continued)

FOREIGN PATENT DOCUMENTS

| JP | 2012-209941 A | 10/2012 |
| JP | 2013-90031 A | 5/2013 |
| JP | 2015-29215 A | 2/2015 |

OTHER PUBLICATIONS

International Search Report and Written Opinion of PCT Application No. PCT/JP2019/034716, dated Nov. 26, 2019, 06 pages of ISRWO.

*Primary Examiner* — Behrooz M Senfi
(74) *Attorney, Agent, or Firm* — Chip Law Group

(57) ABSTRACT

The disclosure relates to a display control device, a display control method, and a recording medium capable of performing more reliable stereoscopic viewing. Whether or not a condition for generating erroneous fusion on a presented image is satisfied on the basis of the display mode of a plurality of display objects arranged side by side in one direction on the presented image at the time of displaying the presented image presented in three-dimensional space. The presented image is expressed by an image for a right eye and an image for a left eye for stereoscopic viewing by using fusion in which the image for a right eye and the image for a left eye are superimposed and recognized as one image. Then, control of applying a predetermined effect to display of the presented image is performed on the basis of the determination result. The present technology can be applied to, for example, a stereoscopic display system using a head-mounted display.

17 Claims, 17 Drawing Sheets

(56) References Cited

U.S. PATENT DOCUMENTS

2014/0198191 A1* 7/2014 Yasuda ............... H04N 13/344
  348/53
2017/0230641 A1* 8/2017 Scavezze ............ H04N 13/239

* cited by examiner

FIG. 2A
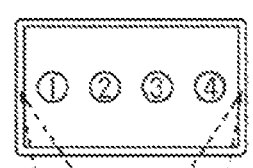
FIG. 2B
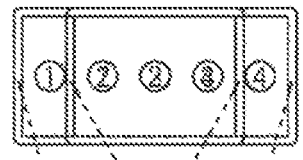

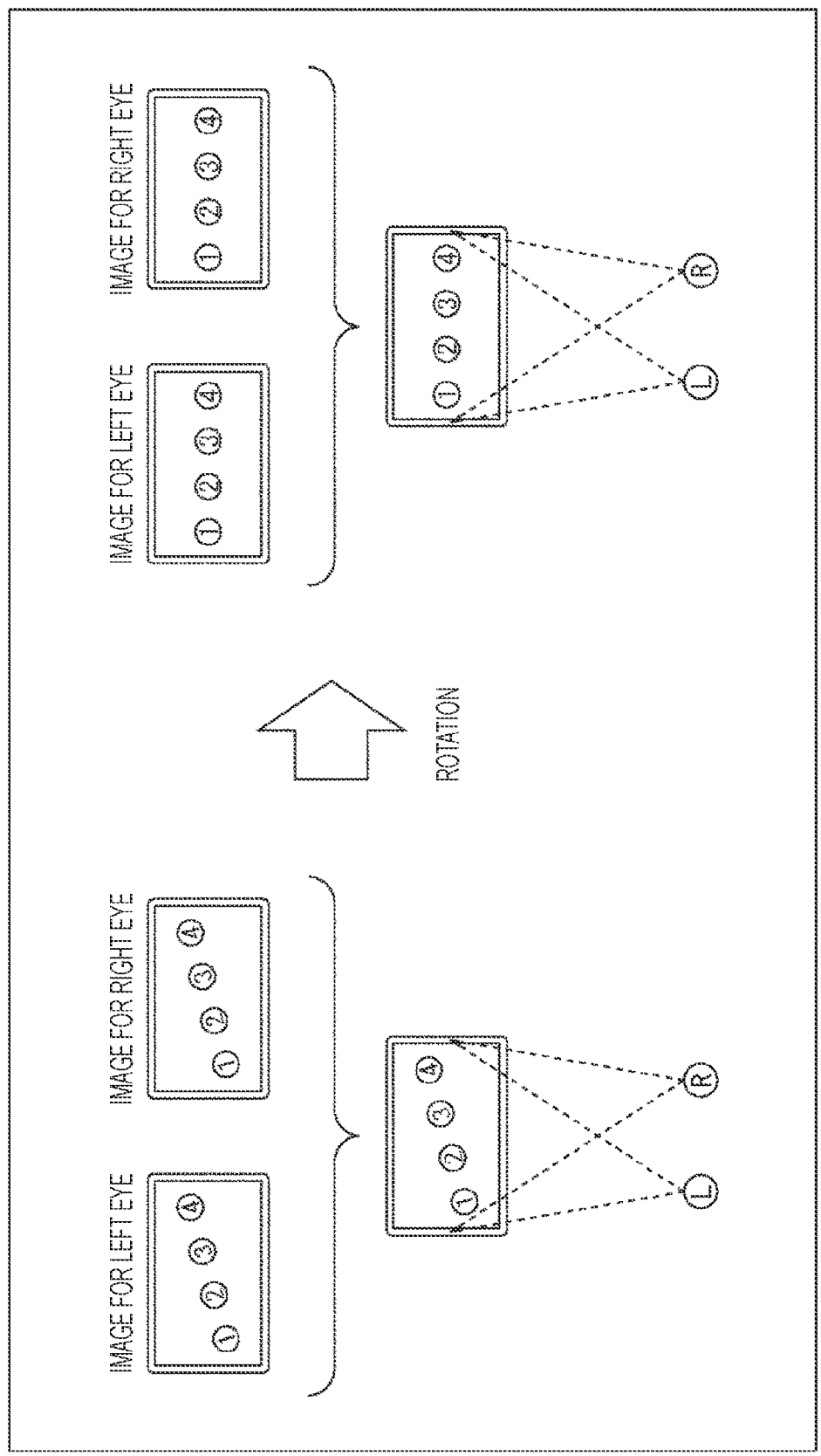

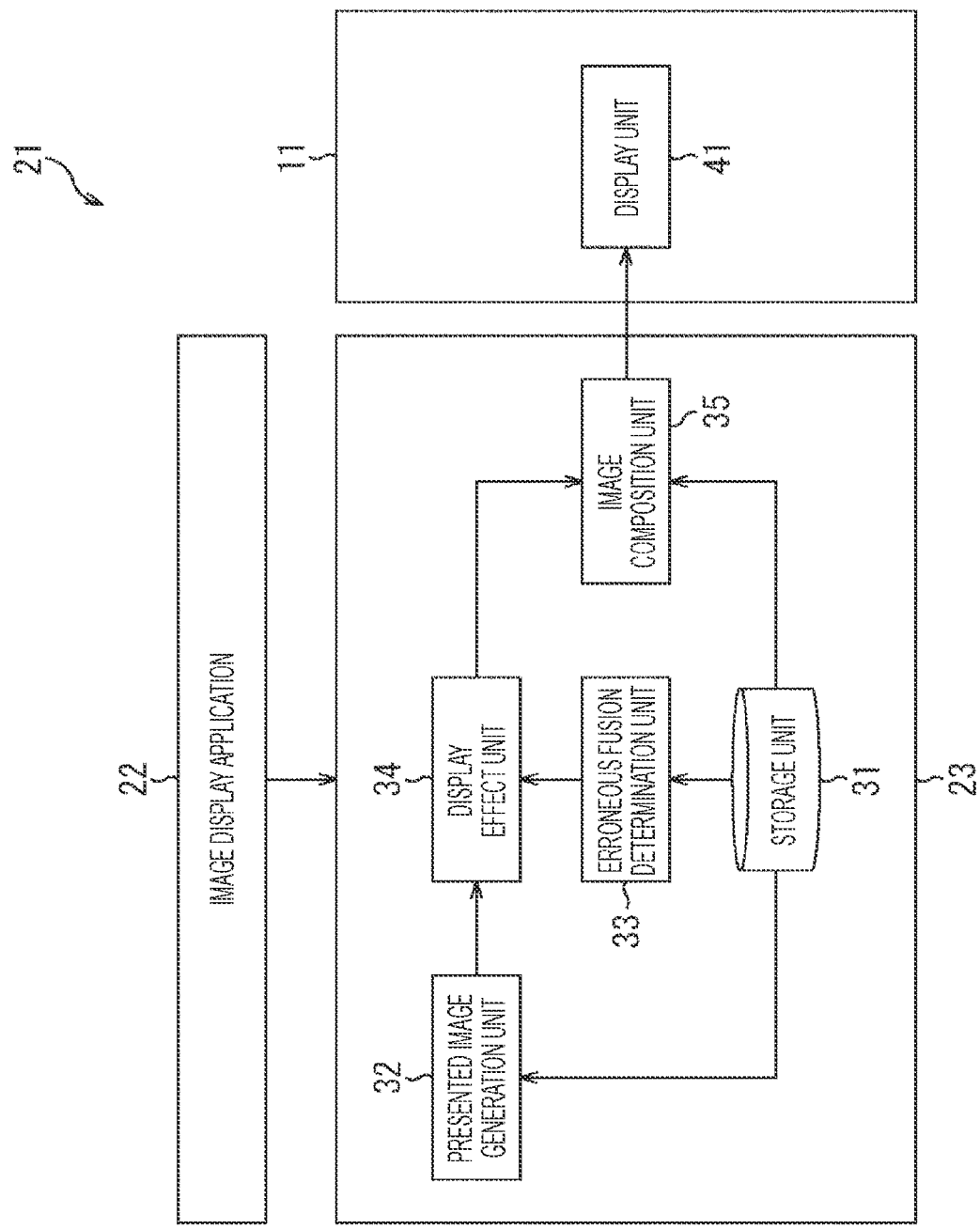

DISPLAY CONTROL DEVICE, DISPLAY CONTROL METHOD, AND RECORDING MEDIUM

CROSS REFERENCE TO RELATED APPLICATIONS

This application is a U.S. National Phase of International Patent Application No. PCT/JP2019/034716 filed on Sep. 4, 2019, which claims priority benefit of Japanese Patent Application No. JP 2018-173553 filed in the Japan Patent Office on Sep. 18, 2018. Each of the above-referenced applications is hereby incorporated herein by reference in its entirety.

TECHNICAL FIELD

The present disclosure relates to a display control device, a display control method, and a recording medium, particularly to a display control device, a display control method, and a recording medium capable of performing more reliable stereoscopic viewing.

BACKGROUND ART

Conventionally, research and development have been carried out on a technique for allowing a user to stereoscopically perceive an image (hereinafter, also referred to as a stereoscopic display technique). Such a stereoscopic display technique includes a technique for allowing a user to stereoscopically perceive an image by controlling the parallax between an image for a left eye and an image for a right eye (hereinafter, also collectively referred to as an image for stereoscopic viewing).

Unfortunately, the stereoscopic perception of an image by a user (hereinafter, also referred to as stereoscopic viewing) imposes a burden on the user. For this reason, a stereoscopic display technique that reduces the burden on a user is desired. Note that, in the following, a stereoscopically viewed image is also referred to as a stereoscopic viewing image or a stereoscopic viewing object.

In relation to this, Patent Document 1 discloses an image processing device that automatically adjusts the depth of a stereoscopic viewing image. Here, the depth is the degree of ejection or retraction from a screen of an observation target perceived by a user. This causes the observation target to be displayed at a depth suitable for the user who observes a stereoscopic viewing image, reducing a burden on the user.

CITATION LIST

Patent Document

Patent Document 1: Japanese Patent Application Laid-Open No. 2013-90031

SUMMARY OF THE INVENTION

Problems to be Solved by the Invention

In conventional stereoscopic display techniques, however, a user sometimes has difficulty in stereoscopically viewing an image depending on a specific condition (e.g., a display mode of a display object and a presentation distance to a presented image).

The disclosure has been made in view of such a situation, and enables more reliable stereoscopic viewing.

Solutions to Problems

A display control device according to one aspect of the disclosure includes: an erroneous fusion determination unit that determines whether or not a condition for generating erroneous fusion on a presented image is satisfied on the basis of a display mode of a plurality of display objects arranged side by side in one direction on the presented image at a time of displaying the presented image presented in three-dimensional space, the presented image being expressed by two images for stereoscopic viewing by using fusion in which the two images are superimposed and recognized as one image; and a display effect control unit that performs control of applying a predetermined effect to display of the presented image on the basis of a determination result.

A display control method or a program according to one aspect of the disclosure includes: determining whether or not a condition for generating erroneous fusion on a presented image is satisfied on the basis of a display mode of a plurality of display objects arranged side by side in one direction on the presented image at a time of displaying the presented image presented in three-dimensional space, the presented image being expressed by the two images by using fusion in which the two images are superimposed and recognized as one image; and performing control of applying a predetermined effect to display of the presented image on the basis of a determination result.

In one aspect of the disclosure, whether or not a condition for generating erroneous fusion on a presented image is satisfied is determined on the basis of a display mode of a plurality of display objects arranged side by side in one direction on the presented image at a time of displaying the presented image presented in three-dimensional space, the presented image being expressed by the two images for stereoscopic viewing by using fusion in which the two images are superimposed and recognized as one image, and control of applying a predetermined effect to display of the presented image is performed on the basis of a determination result.

Effects of the Invention

According to one aspect of the disclosure, more reliable stereoscopic viewing can be performed.

Note that the effects described here are not necessarily limitative, and any of the effects described in the disclosure may be exhibited.

BRIEF DESCRIPTION OF DRAWINGS

FIGS. 2A and 2B illustrate occurrence of erroneous fusion.

FIG. 4 illustrates the first display effect.

FIG. 5 is a block diagram illustrating a configuration example of a first embodiment of a display system.

MODE FOR CARRYING OUT THE INVENTION

Hereinafter, specific embodiments to which the present technology is applied will be described in detail with reference to the drawings.

<Basic Concept of Display Control Method>

First, the basic concept of a display control method to which the present technology is applied will be described with reference to FIGS. 1, 2, 3, and 4.

Figure 1:
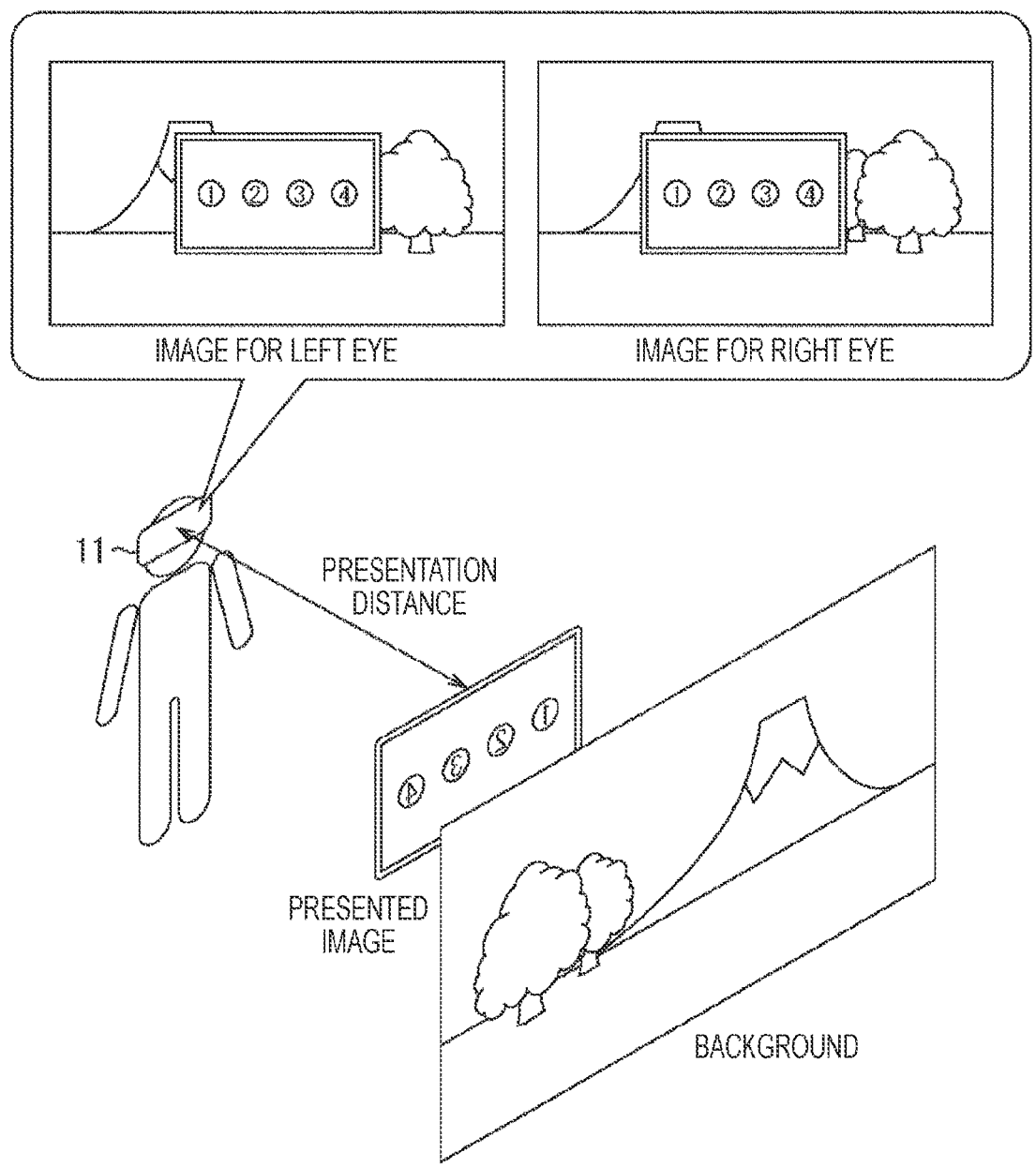
FIG. 1 illustrates the basic concept of a display control method to which the present technology is applied.

FIG. 1 schematically illustrates a user wearing a head-mounted display 11 performing stereoscopic viewing.

As illustrated in FIG. 1, an image for a right eye and an image for a left eye for stereoscopic viewing are displayed side by side in a right-and-left direction on the head-mounted display 11 worn so as to cover the field of view of the user. Then, in a case where the user superimposes the image for a right eye and the image for a left eye, and correctly recognizes (fuses) the superimposed image as one image, three-dimensional space is expressed by the image for a right eye and the image for a left eye.

In the example in FIG. 1, a presented image is stereoscopically presented on the front side of a background image serving as a background as if floating in the three-dimensional space expressed by the image for a right eye and the image for a left eye. Furthermore, for example, in a case where a menu screen for a user interface for a user to select an operation is used as the presented image, a plurality of display objects (round icons with numbers 1 to 4) for executing the selection is arranged.

Then, in a case where a display mode, in which a plurality of display objects is arranged side by side at equal intervals in a right-and-left direction in the field of view of the user, is adopted, the user may have difficulty in superimposing the image for a right eye and the image for a left eye and correctly recognizing the superimposed image as one image, which may cause erroneous fusion. Also, in a case where the position of the presented image in the three-dimensional space expressed by the image for a right eye and the image for a left eye is close to the user, that is, in a case where a presentation distance to the presented image recognized by the user is short, the erroneous fusion easily occurs.

Occurrence of erroneous fusion will be described with reference to FIGS. 2A and 2B.

For example, as illustrated in A of FIG. 2A, in a case where an image for a right eye is viewed with a right eye and an image for a left eye is viewed with a left eye so that the image for a right eye and the image for a left eye are superimposed, intended fusion is performed. At this time, each of a plurality of display objects arranged in the image for a right eye is superimposed on each corresponding one of a plurality of display objects arranged in the image for a left eye. Here, an angle between a line-of-sight from a right-eye viewpoint R to the image for a right eye and a line-of-sight from a left-eye viewpoint L to the image for a left eye corresponds to a convergence angle.

Then, in a case where the display mode, in which a plurality of display objects is arranged side by side at equal intervals in the right-and-left direction, is adopted, a plurality of convergence angles is generated. The plurality of convergence angles allows fusion of the image for a right eye and the image for a left eye. In the fusion, each of the plurality of display objects is superimposed on a display object different from a corresponding display object. As a result, unintended fusion is performed at a convergence angle deviated from the angle of convergence during intended fusion.

That is, as illustrated in FIG. 2B, the convergence angle at which adjacent display objects are superimposed is formed, and unintended fusion is performed. That is, there is generated erroneous fusion in which a first display object in the image for a right eye and a second display object in the image for a left eye are superimposed on each other, a second display object in the image for a right eye and a third display object in the image for a left eye are superimposed on each other, and a third display object in the image for a right eye and a fourth display object in the image for a left eye are superimposed on each other.

In particular, in a case where fusion at a short distance is intended and the presentation distance is short, erroneous fusion often occurs at an angle of convergence for viewing a farther distance than at an intended convergence angle.

Then, more reliable stereoscopic viewing can be performed by performing display control in which a display effect is applied. The display effect avoids the occurrence of such erroneous fusion.

For example, display in an original mode, in which a plurality of display objects is arranged side by side at equal intervals in the right-and-left direction as illustrated in FIGS. 2A and 2B, is defined as that in a first display mode, a display effect is applied. The display effect changes display of the plurality of display objects such that the plurality of display objects is displayed in a second display mode different from the first display mode.

Figure 3A:
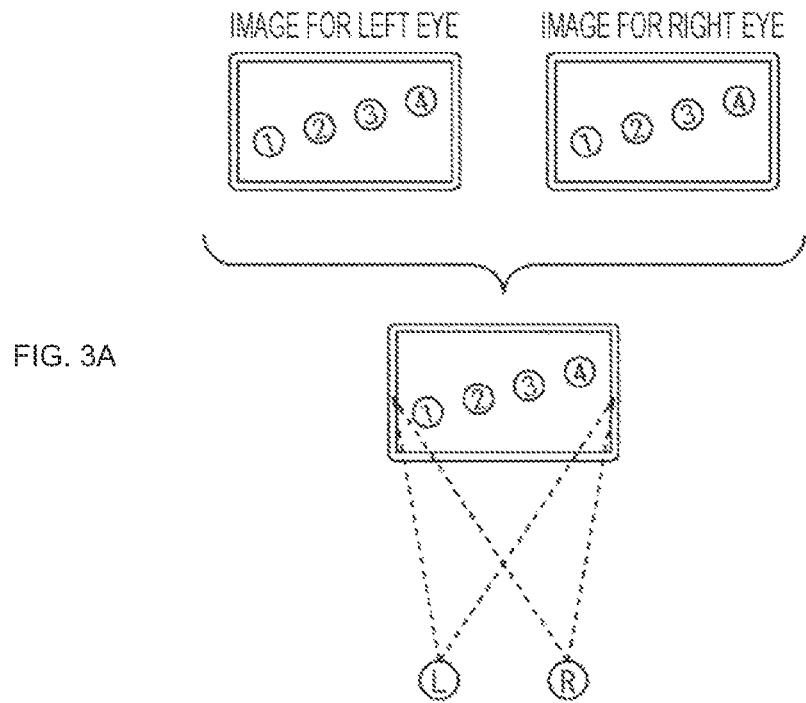
FIGS. 3A and 3B illustrate a first display effect.
Figure 3B:
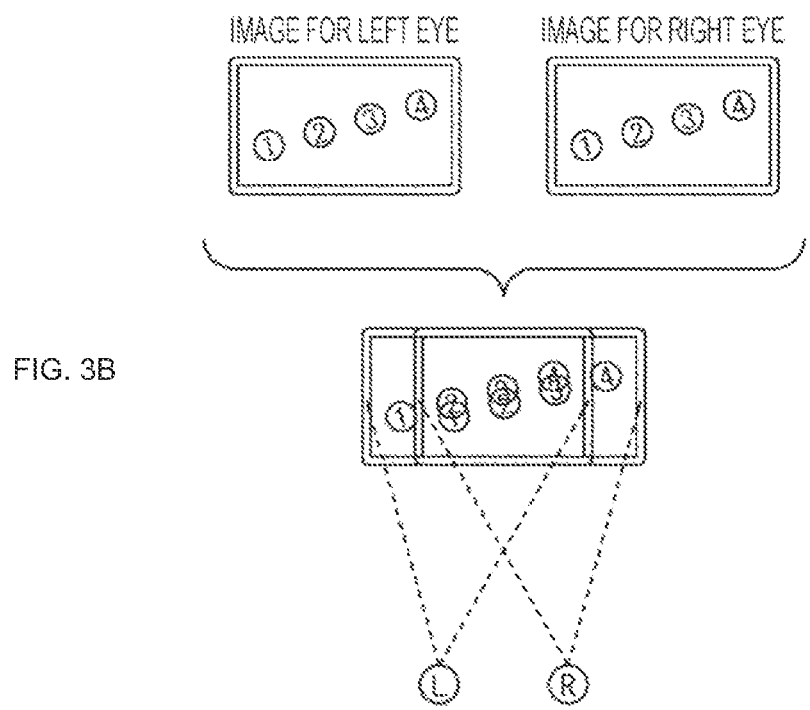

FIGS. 3A and 3B illustrate a state in which a first display effect is applied.

As illustrated in FIGS. 3A and 3B, in the first display effect, the arrangement of the plurality of display objects is changed so that the plurality of display objects is in the second display mode. In the second display mode, the plurality of display objects is arranged side by side in an oblique direction different from the right-and-left direction.

Even in a case where a plurality of display objects is arranged in the oblique direction in this way, as illustrated in FIG. 3A, in a case of a correct convergence angle, an image for a right eye and an image for a left eye are superimposed, and intended fusion is performed.

In contrast, as illustrated in FIG. 3B, in a case where an angle of convergence deviates from the correct angle of convergence and a plurality display objects is arranged in an oblique direction, superimposition of each of the plurality of display objects on a display object different from a corresponding display object is avoided. In this way, applying the first display effect enables fusion only at a correct angle of convergence without generation of a plurality of convergence angles that enables fusion of the image for a right eye and the image for a left eye. That is, occurrence of erroneous fusion can be prevented.

Note that, in a case where the presentation distance for presenting a presented image is short enough to make fusion at an intended convergence angle difficult, a tilt angle in the oblique direction in which the plurality of display objects is arranged may be further increased.

Then, at the time of starting display of the presented image, the presented image is displayed in the second display mode, and presented for a certain period of time (approximately several seconds), whereby a presented image viewed by the user is guided to be an intended fused image.

Thereafter, as illustrated in FIG. 4, the plurality of display objects is continuously and rotationally moved so that the plurality of display objects is in from the second display mode to the first display mode. This enables the user to perform fusion and obtain a presented image as intended even after the plurality of display objects obliquely arranged side by side is moved so as to be in the first display mode in which the plurality of display objects is arranged side by side in the right-and-left direction.

Note that, although, basically, a display effect is usually executed only once at the time of starting display of a presented image, the display effect may be re-executed in accordance with a user operation, for example, in a case where an intended fused state cannot be maintained due to some visual disturbance. For example, the user can operate a button for giving an instruction to re-execute the display effect, and perform a gesture operation for giving an instruction to re-execute the display effect. Furthermore, the presented image may be a planar image having no depth information, and is not limited to a stereoscopic object.

<First Configuration Example of Display System>

FIG. 5 is a block diagram illustrating a configuration example of a first embodiment of a display system to which the present technology is applied.

As illustrated in FIG. 5, a stereoscopic display system 21 includes the head-mounted display 11, an image display application 22, and a display control device 23.

As described above with reference to FIG. 1, the head-mounted display 11 includes a display unit 41 for displaying an image for a right eye and an image for a left eye.

The image display application 22 is, for example, software for a game, which allows a user to perform stereoscopic viewing by using the head-mounted display 11. Then, at the time of instructing the display control device 23 to display a presented image, the image display application 22 supplies information necessary for displaying the presented image. The information includes a type and an arrangement position of display objects arranged in the presented image and a presentation distance for presenting the presented image, for example.

The display control device 23 includes a storage unit 31, a presented image generation unit 32, an erroneous fusion determination unit 33, a display effect unit 34, and an image composition unit 35.

The storage unit 31 stores data necessary for displaying a presented image, a background image, and the like, for example, drawing data of display objects and drawing data of a background image.

The presented image generation unit 32 generates a presented image to be displayed on the head-mounted display 11 in accordance with an instruction of the image display application 22. At this time, the presented image generation unit 32 reads the drawing data of display objects from the storage unit 31 on the basis of information supplied from the image display application 22, and generates a presented image in which the display objects are arranged at original arrangement positions, that is, in the first display mode.

The erroneous fusion determination unit 33 determines whether or not the display mode of the display objects arranged in the presented image generated by the presented image generation unit 32 satisfies the condition for generating erroneous fusion on the basis of information supplied from the image display application 22. For example, as described above, the erroneous fusion determination unit 33 determines that the condition for generating erroneous fusion is satisfied in a case where a plurality of objects is arranged at equal intervals in the right-and-left direction. Note that the condition for generating erroneous fusion will be described later with reference to FIGS. 15A, 15B, and 16.

Furthermore, as described above, in a case where a presented image is nearby presented, erroneous fusion often occurs. For that reason, the erroneous fusion determination unit 33 determines whether or not the presentation distance for presenting the presented image is equal to or less than a preset reference distance, in which erroneous fusion is considered to easily occur, on the basis of the information supplied from the image display application 22.

The display effect unit 34 applies a display effect to the presented image generated by the presented image generation unit 32, and supplies the presented image to the image composition unit 35 in accordance with a determination result of the erroneous fusion determination unit 33. For example, in a case where the display mode of the display objects satisfies the condition for generating erroneous fusion and the presentation distance is equal to or less than a reference distance, the display effect unit 34 applies the display effect to the presented image. In contrast, in a case where the display mode of the display objects does not satisfy the condition for generating erroneous fusion or the presentation distance is more than the reference distance, the display effect unit 34 does not apply the display effect to the presented image, and supplies the presented image to the image composition unit 35 as it is.

The image composition unit 35 reads the drawing data of the background image from the storage unit 31, and composes a presented image supplied from the display effect unit 34 in accordance with an instruction of the image display application 22. At this time, the image composition unit 35 adjusts the position where a presented image is to be composed of an image for a right eye and an image for a left eye in accordance with the presentation distance for presenting a presented image, and generates the image for a right eye and the image for a left eye such that the presented image is stereoscopically displayed at the presentation distance. Then, the image composition unit 35 supplies the generated image for a right eye and image for a left eye to the head-mounted display 11, and causes the head-mounted display 11 to display the images on the display unit 41.

Note that, in a case where the head-mounted display 11 performs augmented reality (AR) display, the image composition unit 35 does not perform composition with a background image, and generates the image for a right eye and the image for a left eye such that the presented image is stereoscopically displayed in the background of actual space.

In the stereoscopic display system 21 configured in this way, the occurrence of erroneous fusion can be avoided and more reliable stereoscopic viewing can be performed by the display effect unit 34 applying a display effect in accordance with a determination result of the erroneous fusion determination unit 33.

<First Processing Example of Display Control Processing>

Figure 6:
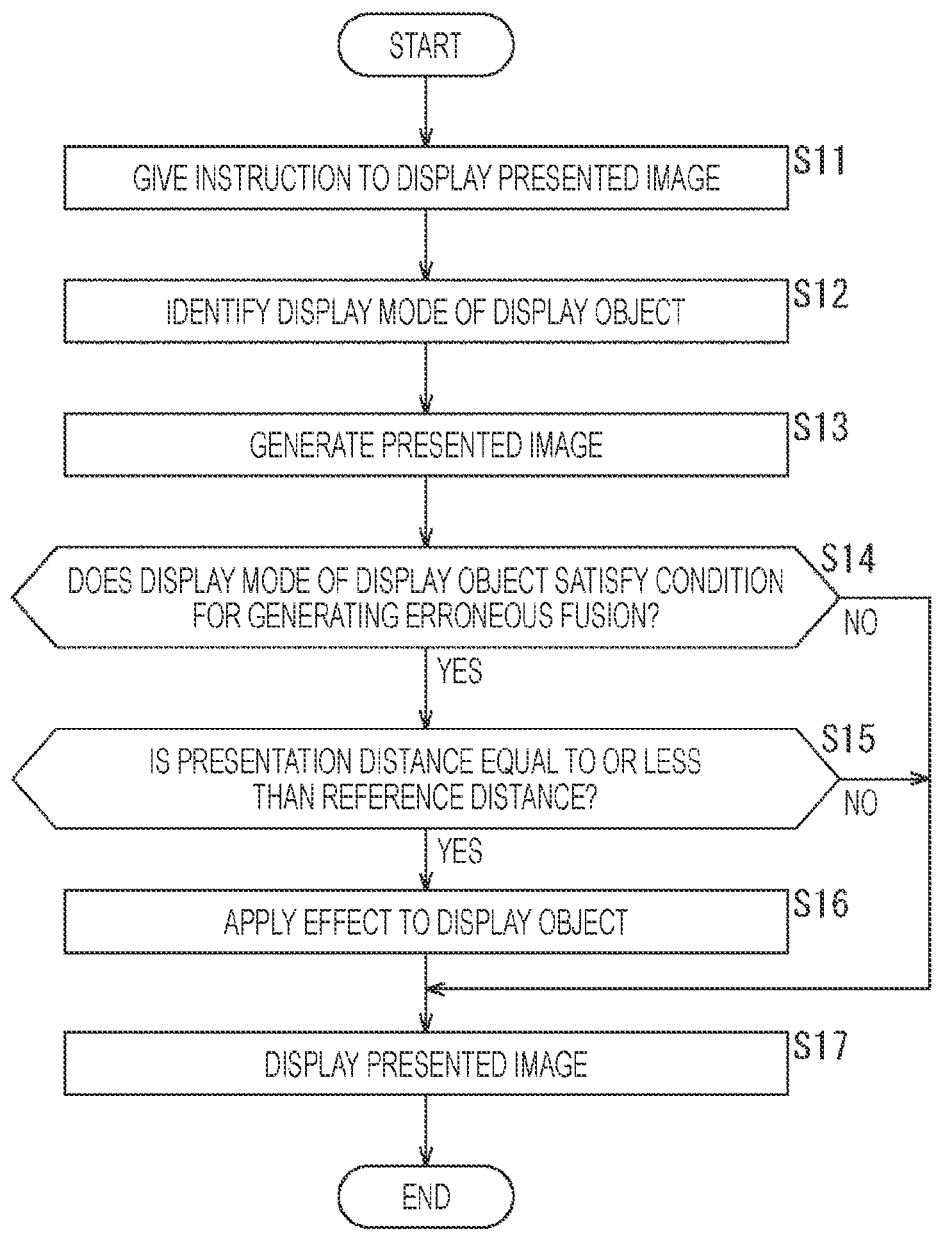
FIG. 6 is a flowchart illustrating a first processing example of display control processing.

FIG. 6 is a flowchart illustrating a first processing example of display control processing performed in the stereoscopic display system 21.

For example, processing is started at the time when a presented image is newly displayed in display in which the image display application 22 causes the head-mounted display 11 to perform stereoscopic viewing. In Step S11, the image display application 22 gives an instruction to display a presented image, and supplies information necessary for displaying the presented image.

In Step S12, the presented image generation unit 32 and the erroneous fusion determination unit 33 identify the display mode of a display object on the basis of the information supplied from the image display application 22 in Step S11.

In Step S13, the presented image generation unit 32 generates a presented image in which a plurality of display objects is arranged in accordance with the display mode identified in Step S12.

In Step S14, the erroneous fusion determination unit 33 determines whether or not the display mode of the display objects identified in Step S12 satisfies a condition for generating erroneous fusion.

In a case where the erroneous fusion determination unit 33 determines in Step S14 that the display mode of the display objects satisfies the condition for generating erroneous fusion, the processing proceeds to Step S15.

In Step S15, the erroneous fusion determination unit 33 determines whether or not a presentation distance for presenting a presented image is equal to or less than a reference distance on the basis of the information supplied from the image display application 22 in Step S11.

In a case where the erroneous fusion determination unit 33 determines in Step S15 that the presentation distance for presenting a presented image is equal to or less than the reference distance, the processing proceeds to Step S16.

In Step S16, the display effect unit 34 applies a display effect to the presented image generated by the presented image generation unit 32 in Step S13, and supplies the presented image to the image composition unit 35. The processing then proceeds to Step S17.

In contrast, in a case where the display mode of the display objects is determined not to satisfy the condition for generating erroneous fusion in Step S14, or where the presentation distance for presenting a presented image is not equal to or less than the reference distance (greater than the reference distance) in Step S15, the processing proceeds to Step S17.

In Step S17, the image composition unit 35 combines the presented image supplied from the display effect unit 34 with a background image, and generates an image for a right eye and an image for a left eye. The image composition unit 35 displays the images on the display unit 41 of the head-mounted display 11. The processing is then ended.

The display control processing as described above enables more reliable stereoscopic viewing at the time of starting display of a presented image.

<Variations of Display Effect>

Variations of the display effect will be described with reference to FIGS. 7 to 11.

Figure 7:
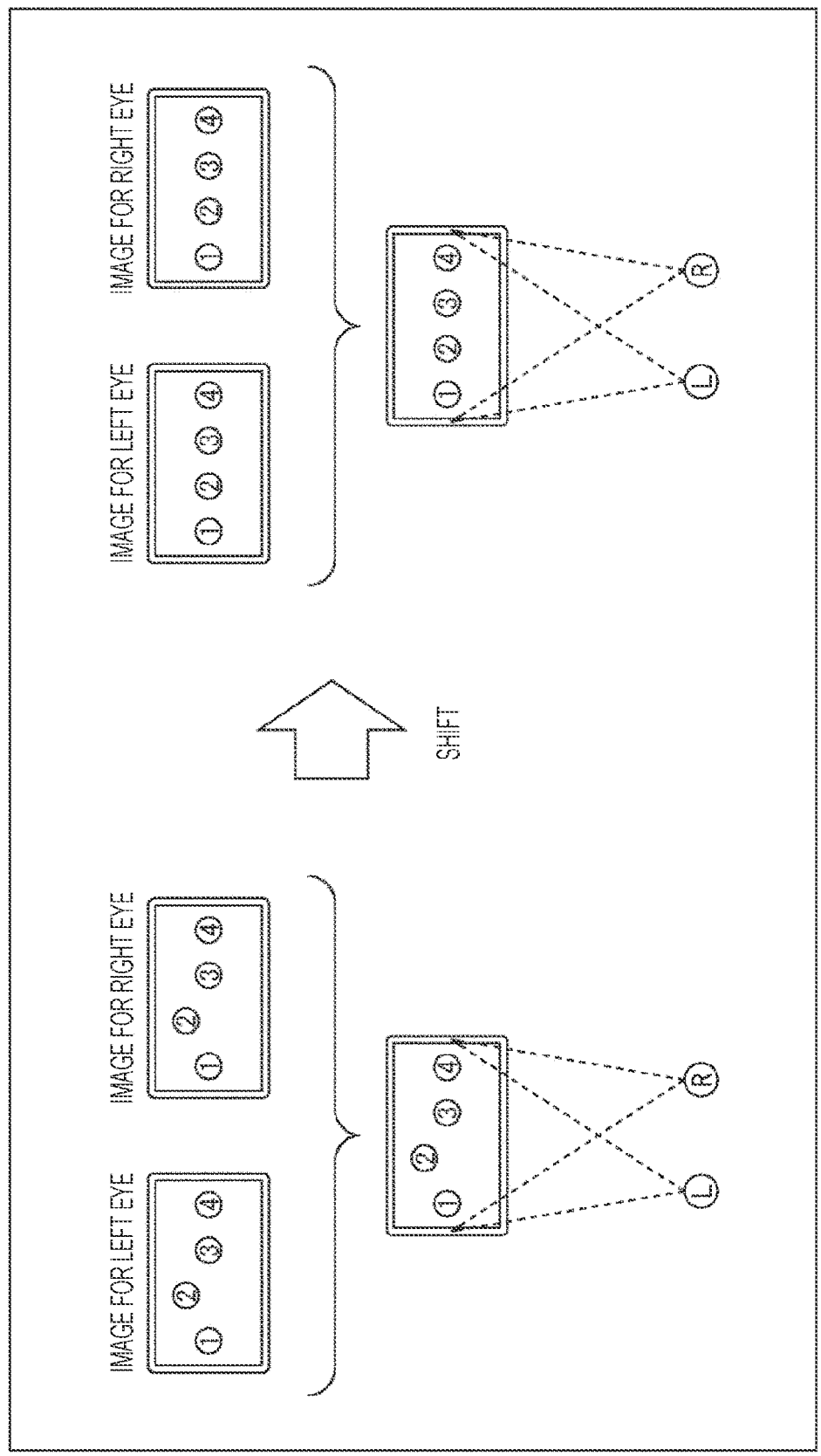
FIG. 7 illustrates a second display effect.

FIG. 7 illustrates a second display effect.

As illustrated in FIG. 7, display is performed in a second display mode at the time of starting display of a presented image. In the second display mode, at least one of a plurality of display objects is displayed in an arrangement in which the one display object is made eccentric in an up-and-down direction orthogonal to the right-and-left direction. In the example of FIG. 7, the second display objects are eccentrically arranged in an upward direction.

Then, after performing display in the second display mode for a certain period of time (approximately several seconds), the objects are shifted, that is, the second display objects are moved in a downward direction, so that the first display mode is used. In the first display mode, all the plurality of display objects is displayed in an arrangement in which all the plurality of display objects is aligned in the right-and-left direction.

Note that, in a case where the presentation distance for presenting a presented image is short enough to make fusion at an intended convergence angle difficult, an eccentricity amount of a display object displayed in an arrangement in which the display object is made eccentric in the up-and-down direction may be further increased.

This enables a user to perform fusion and obtain a presented image as intended even after movement is performed so as to use the first display mode. In the first display mode, all the display objects are arranged side by side in the right-and-left direction.

Figure 8:
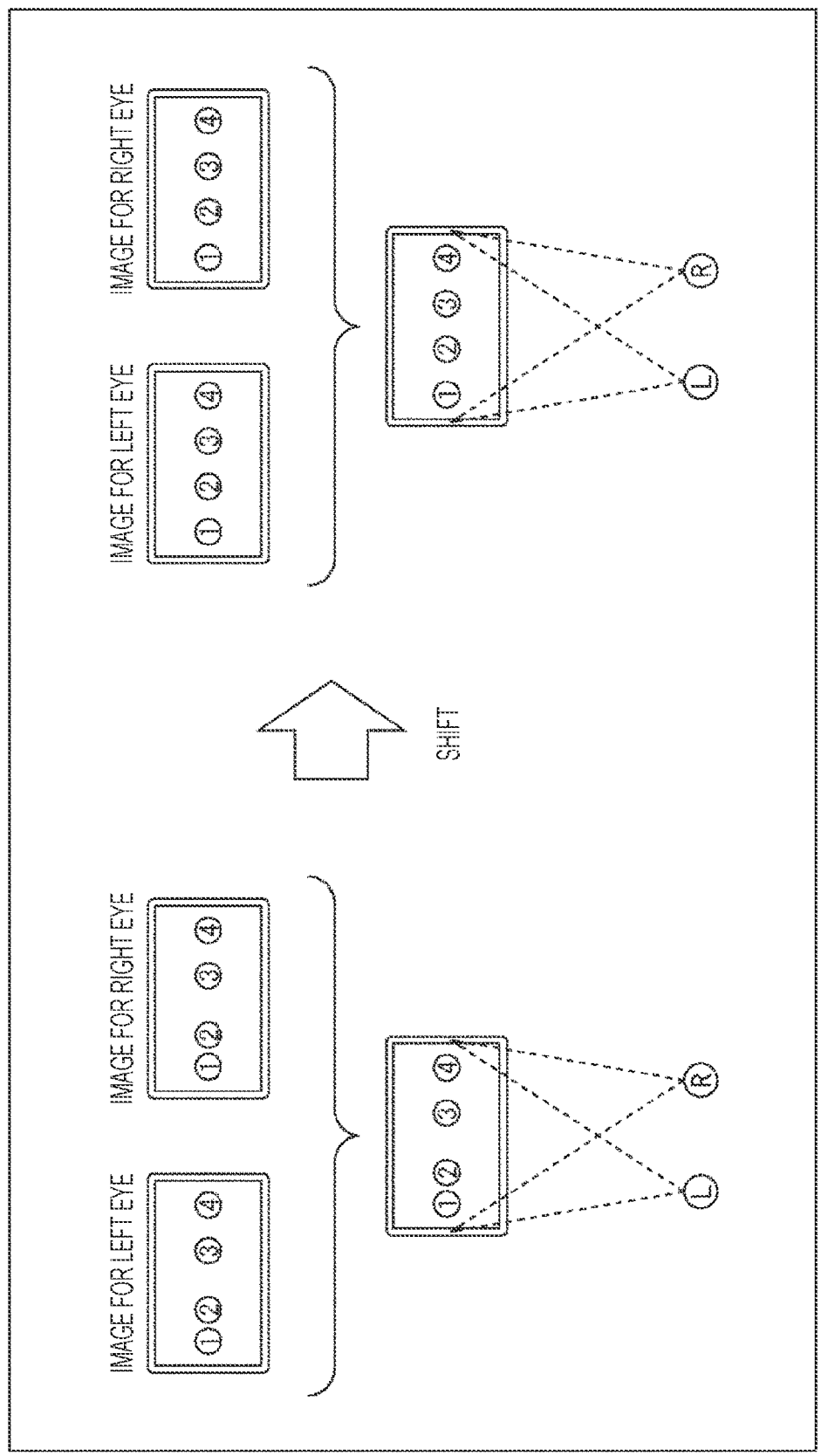
FIG. 8 illustrates a third display effect.

FIG. 8 illustrates a third display effect.

As illustrated in FIG. 8, display is performed in a second display mode at the time of starting display of a presented image. In the second display mode, at least one of a plurality of display objects is displayed in an arrangement in which the one display object is placed at unequal intervals in the right-and-left direction. In the example of FIG. 8, the second display objects are arranged at unequal intervals in a left direction.

Then, after performing display in the second display mode for a certain period of time (approximately several seconds), the objects are shifted, that is, the second display objects are moved in a right direction, so that the first display mode is used. In the first display mode, all the plurality of display objects is displayed in an arrangement in which all the plurality of display objects is aligned at equal intervals in the right-and-left direction.

Note that, in a case where the presentation distance for presenting a presented image is short enough to make fusion at an intended convergence angle difficult, a shift amount of the display objects displayed in an arrangement in which the display objects are placed at unequal intervals in the left direction may be further increased.

This enables a user to perform fusion and obtain a presented image as intended even after movement is performed so as to use the first display mode. In the first display mode, all the display objects are arranged side by side in the right-and-left direction.

Figure 9:
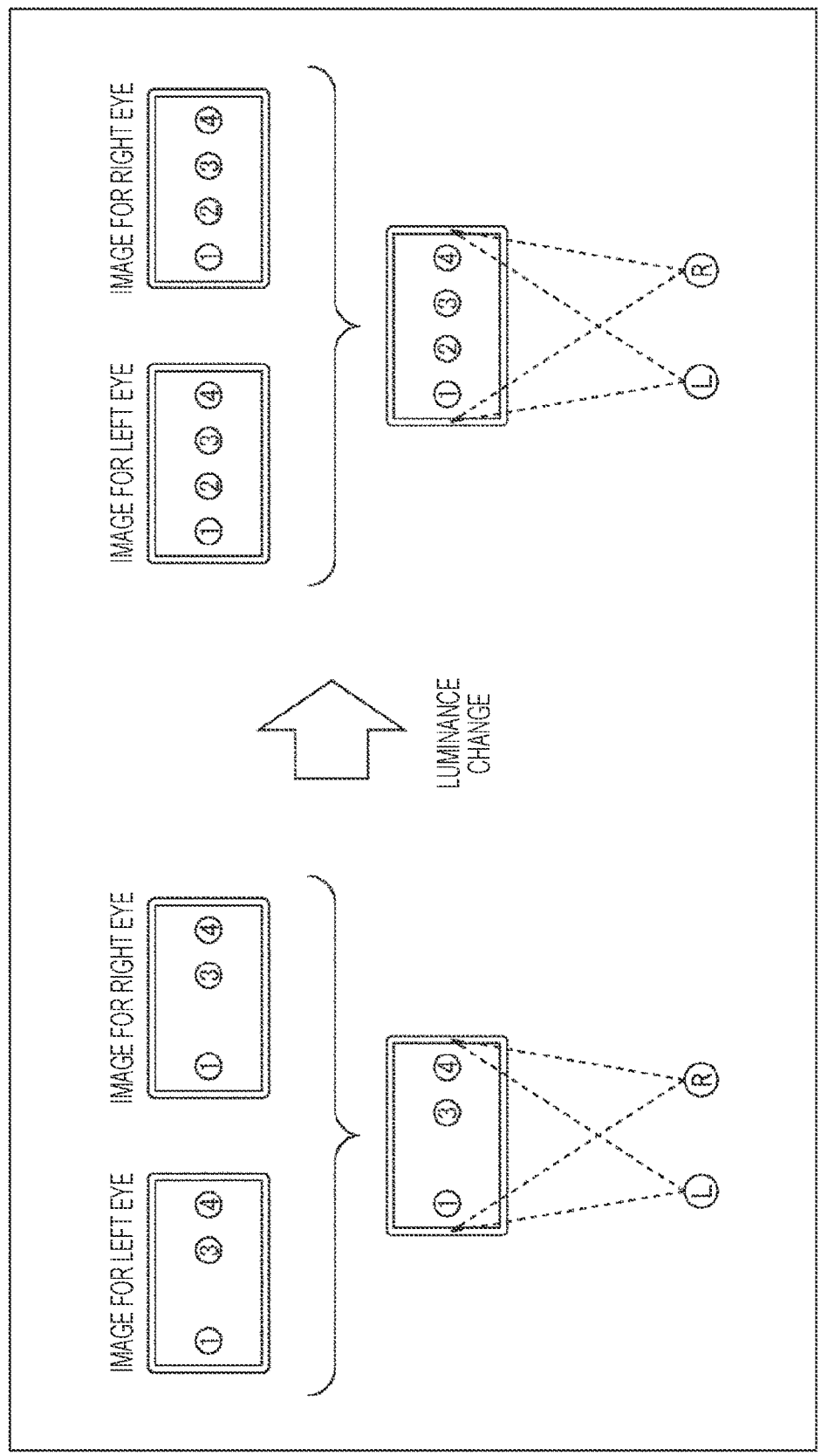
FIG. 9 illustrates a fourth display effect.

FIG. 9 illustrates a fourth display effect.

As illustrated in FIG. 9, display is performed in a second display mode at the time of starting display of a presented image. In the second display mode, at least one of a plurality of display objects has a luminance lower than an original luminance. In the example of FIG. 9, the second display objects are displayed at a luminance of 0 (i.e., hidden).

Then, after performing display in the second display mode for a certain period of time (approximately several seconds), the luminance of the objects is changed, that is, the luminance of the second display objects is increased, so that the first display mode is used. In the first display mode, all the plurality of display objects is displayed at the original luminance.

Note that, in a case where the presentation distance for presenting a presented image is short enough to make fusion at an intended convergence angle difficult, a luminance change amount of the display objects displayed at a low luminance may be further increased.

This enables a user to perform fusion and obtain a presented image as intended even after the luminance is changed so that the first display mode is used. In the first display mode, all the display objects are displayed at the original luminance.

Figure 10:
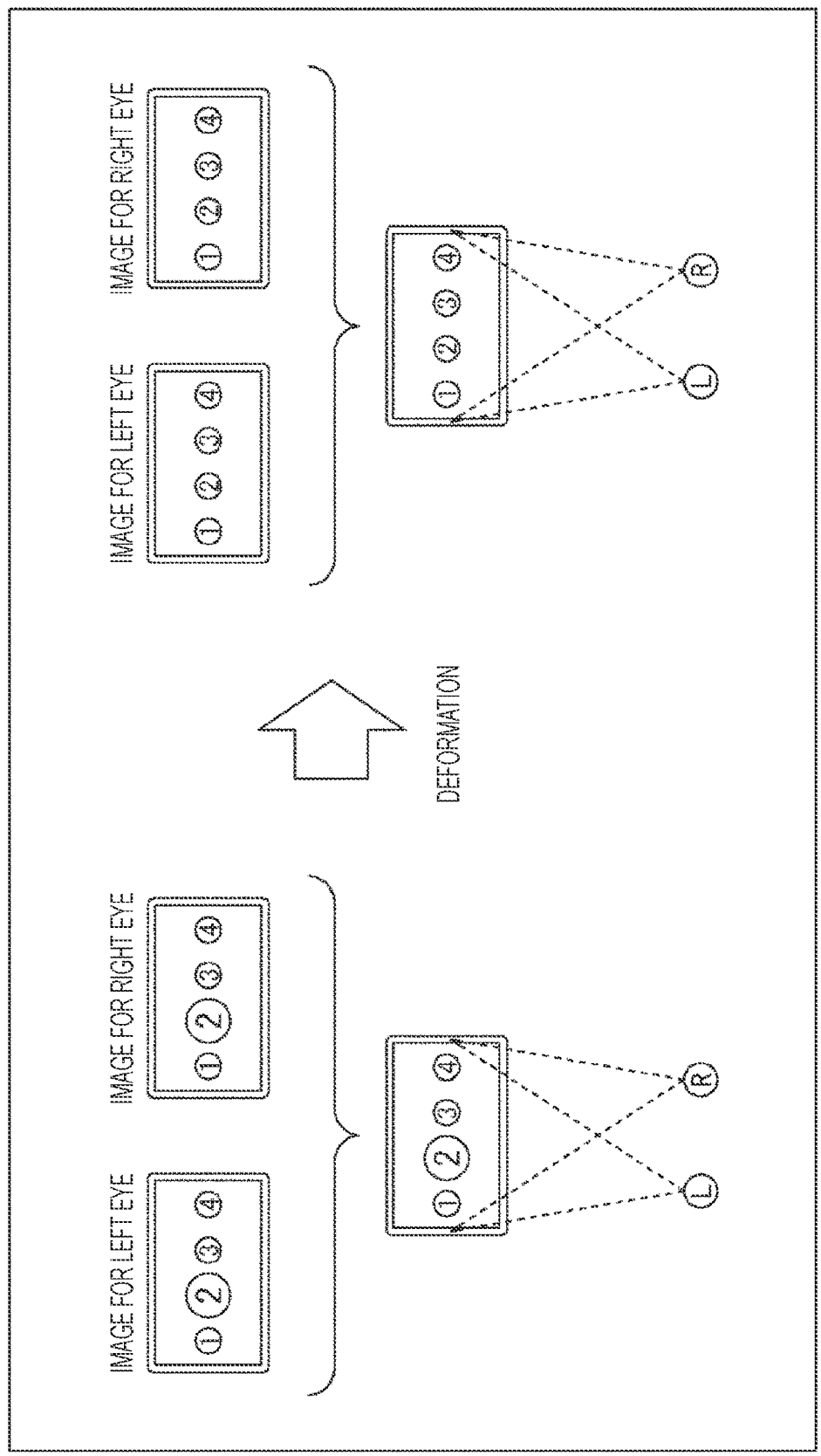
FIG. 10 illustrates a fifth display effect.

FIG. 10 illustrates a fifth display effect.

As illustrated in FIG. 10, display is performed in a second display mode at the time of starting display of a presented image. In the second display mode, at least one of a plurality of display objects has a size larger than the original size. In the example of FIG. 10, the second display objects, which are increased in size, are displayed.

Then, after performing display in the second display mode for a certain period of time (approximately several seconds), the objects are deformed, that is, the second display objects are displayed so as to be decreased in size, so that the first display mode is used. In the first display mode, all the plurality of display objects is displayed in the original size.

Note that, in a case where the presentation distance for presenting a presented image is short enough to make fusion at an intended convergence angle difficult, a change amount of the size of the display objects displayed at the larger size may be further increased.

This enables a user to perform fusion and obtain a presented image as intended even after the size is changed so that the first display mode is used. In the first display mode, all the display objects are displayed at the original size. Note that deformation other than increasing the size (decreasing the size or changing the outer shape) may be performed.

Figure 11:
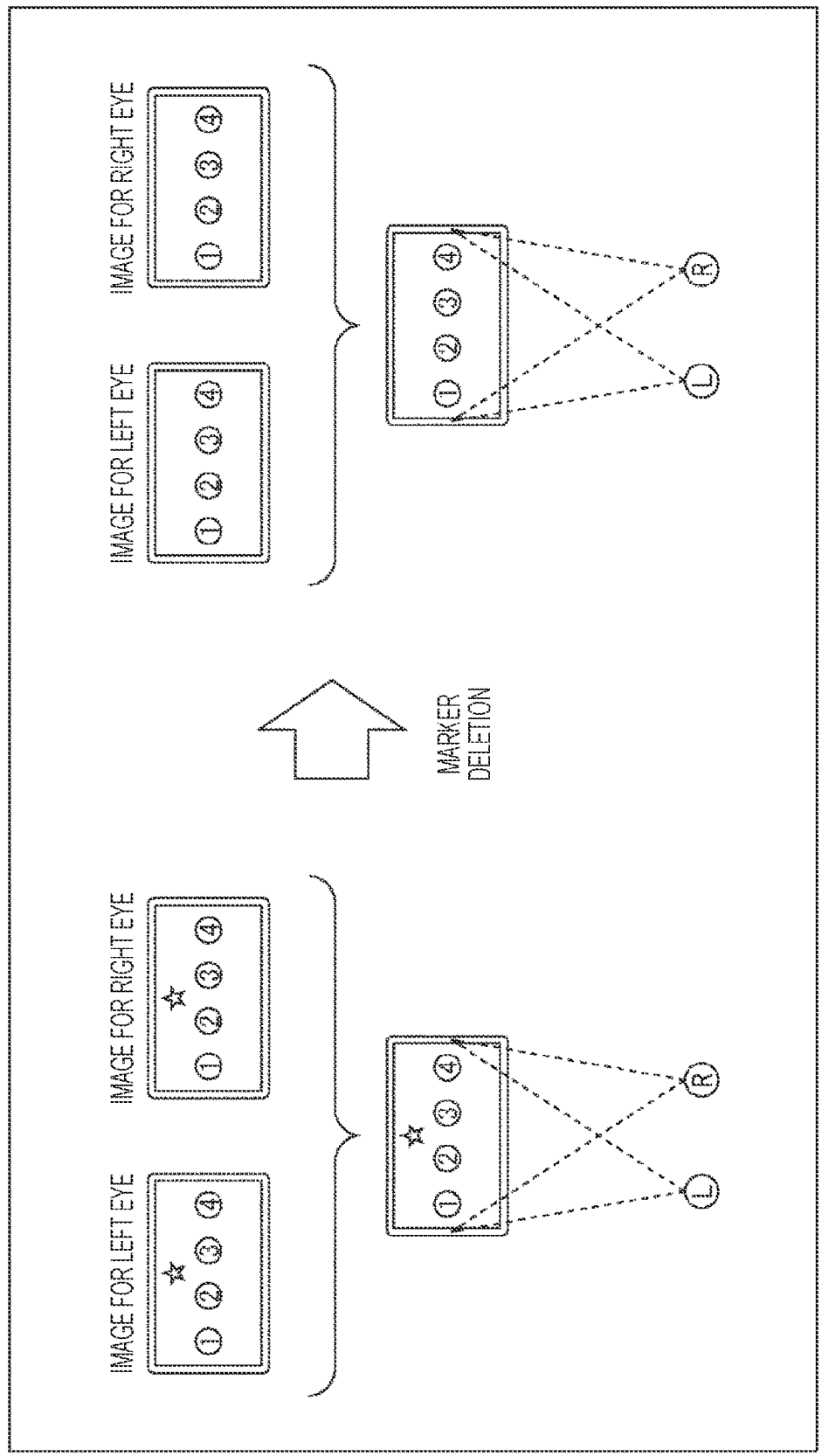
FIG. 11 illustrates a sixth display effect.

FIG. 11 illustrates a sixth display effect.

As illustrated in FIG. 11, display is performed in a second display mode. In the second display mode, an additional image is added to the first display mode including a plurality of display objects originally displayed on a presented image. The additional image is displayed at a predetermined position where an image for a right eye and an image for a left eye are superimposed at the time of being fused. In the example of FIG. 11, a star-shaped marker is additionally displayed at a predetermined position where the image for a right eye and the image for a left eye are superimposed at the time of being fused.

Note that, although, in the example in FIG. 11, the star-shaped marker is used as an additional image, an agent image such as, for example, a character may be used.

Then, after performing display in the second display mode for a certain period of time (approximately several seconds), the additional image is hidden, and the first display mode is used. In the first display mode, only a plurality of display objects that is originally displayed is displayed.

Note that, in a case where the presentation distance for presenting a presented image is short enough to make fusion at an intended convergence angle difficult, the size of the additional image may be increased, or the luminance or the contrast may be increased.

This enables a user to perform fusion and obtain a presented image as intended even after only a plurality of display objects is displayed in the first display mode.

<Second Configuration Example of Display System>

Figure 12:
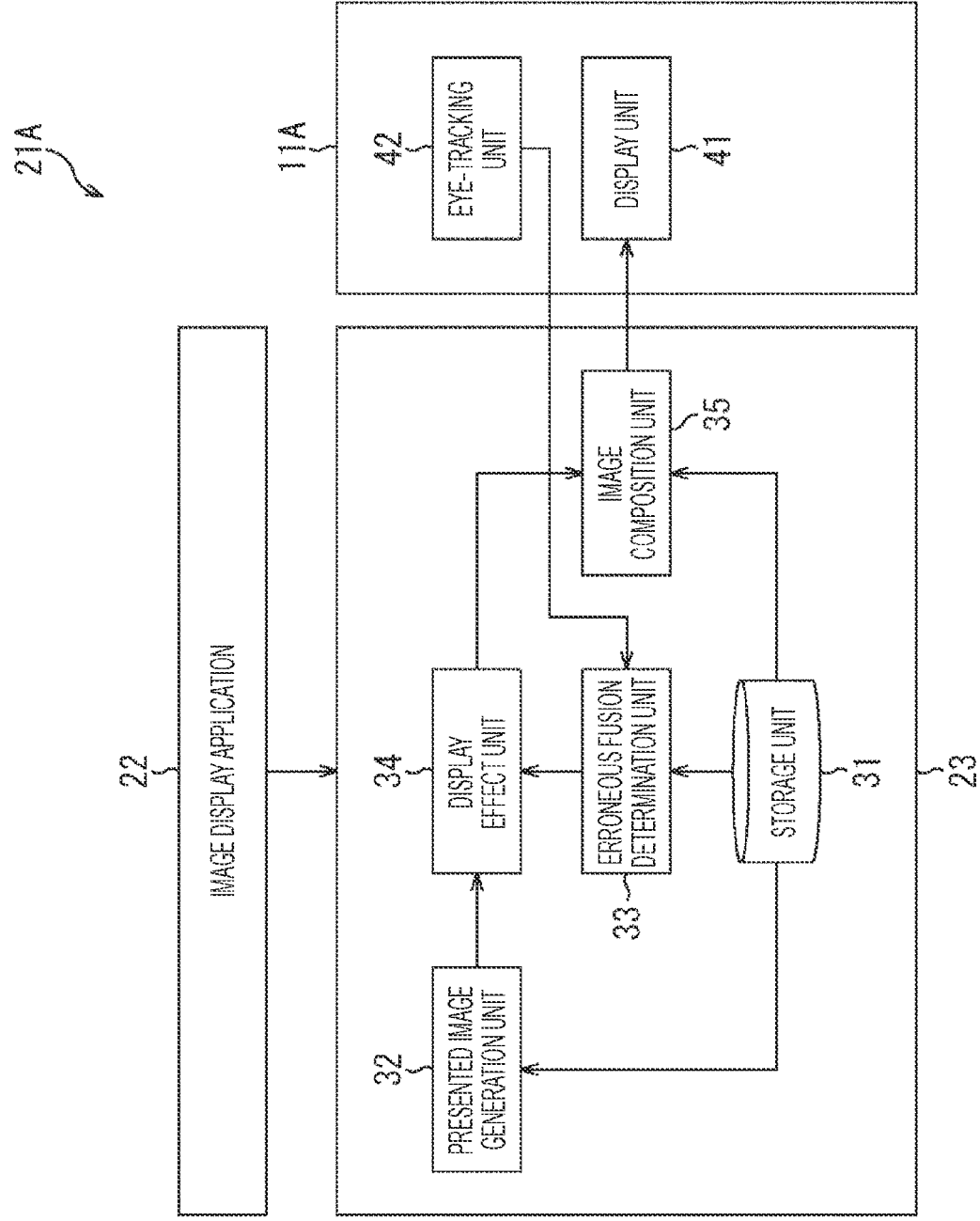
FIG. 12 is a block diagram illustrating a configuration example of a second embodiment of the display system.

FIG. 12 is a block diagram illustrating a configuration example of a second embodiment of a display system to which the present technology is applied. Note that, in a stereoscopic display system 21A in FIG. 12, the same signs are attached to the configurations common to those in the stereoscopic display system 21 in FIG. 5, and detailed description thereof will be omitted.

That is, the stereoscopic display system 21A has a configuration common to that of the stereoscopic display system 21 in FIG. 5 in that the stereoscopic display system 21A includes the image display application 22 and the display control device 23. In contrast, the stereoscopic display system 21A has a configuration different from that of the stereoscopic display system 21 in FIG. 5 in that a head-mounted display 11A has an eye-tracking unit 42 and an eye-tracking result is supplied to the erroneous fusion determination unit 33.

The eye-tracking unit 42 can measure change in line-of-sight based on the eyeball position of a user wearing the head-mounted display 11A, and supplies information on the change to the erroneous fusion determination unit 33 as an eye-tracking result.

The erroneous fusion determination unit 33 monitors the convergence angle between the right and left eyes of the user on the basis of the eye-tracking result. Then, in a case of determining that the convergence angle correctly gazes at the presented image, that is, in a case where convergence angle deviation is less than a threshold, the erroneous fusion determination unit 33 determines not to cause the display effect unit 34 to perform a display effect. In contrast, the erroneous fusion determination unit 33 continuously monitors the convergence angle over a display period of the presented image. In a case where the convergence angle deviation is equal to or more than the threshold, the erroneous fusion determination unit 33 determines to cause the display effect unit 34 to perform the display effect.

In this way, in a case where a presented image is not stereoscopically viewed, the stereoscopic display system 21A guides the presented image so that the presented image becomes a fused image as intended by monitoring a convergence angle. This enables more reliable stereoscopic viewing.

<Second Processing Example of Display Control Processing>

Figure 13:
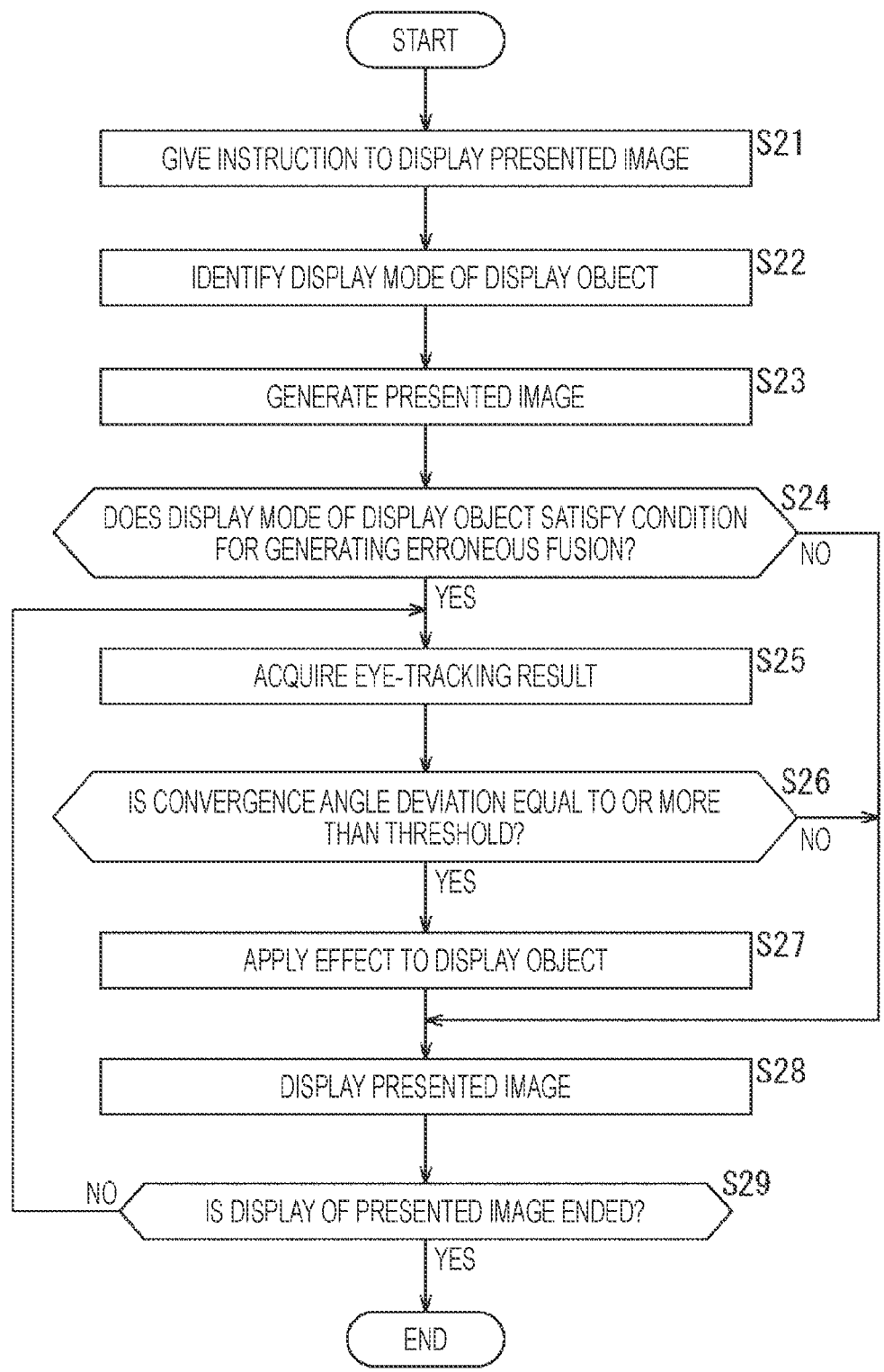
FIG. 13 is a flowchart illustrating a second processing example of the display control processing.

FIG. 13 is a flowchart illustrating a second processing example of the display control processing performed in the stereoscopic display system 21A.

Processing similar to that of Steps S11 to S14 in FIG. 6 is performed in Steps S21 to S24. In Step S25, the erroneous fusion determination unit 33 acquires an eye-tracking result from the eye-tracking unit 42.

In Step S26, the erroneous fusion determination unit 33 determines whether or not the convergence angle deviation is equal to or more than the threshold on the basis of the eye-tracking result acquired in Step S25.

In a case where the erroneous fusion determination unit 33 determines in Step S26 that the convergence angle deviation is equal to or more than the threshold, the processing proceeds to Step S27. In Step S27, the display effect unit 34 applies a display effect to the presented image generated by the presented image generation unit 32 in Step S23, and supplies the presented image to the image composition unit 35. The processing then proceeds to Step S28.

In contrast, in a case where the erroneous fusion determination unit 33 determines in Step S26 that the convergence angle deviation is not equal to or more than (less than) the threshold, the processing of Step S27 is skipped, and the processing proceeds to Step S28.

In Step S28, the image composition unit 35 combines the presented image supplied from the display effect unit 34 with a background image, and generates an image for a right eye and an image for a left eye. The image composition unit 35 displays the images on the display unit 41 of the head-mounted display 11.

Thereafter, in Step S29, it is determined whether or not to end the display of the presented image. The processing of Steps S25 to S29 is repeated until the display of the presented image is determined to be ended. Then, in Step S29, in a case where the display of the presented image is determined to be ended, the processing is ended.

The display control processing as described above enables more reliable stereoscopic viewing not only at the time of starting display of a presented image but always during the display of the presented image.

<Conditions for Generating Erroneous Fusion>

FIGS. 14A, 14B, 14C and 14D illustrate a presented image that easily generates erroneous fusion.

Figure 14A:
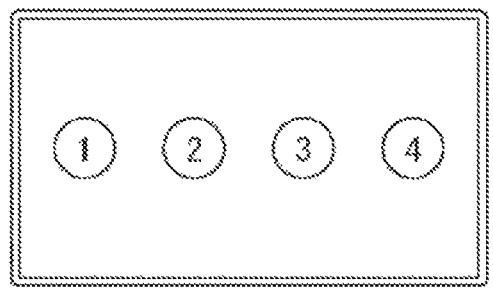
FIGS. 14A, 14B, 14C and 14D illustrate a presented image that easily generates erroneous fusion.

FIG. 14A. illustrates a presented image in which round icons with numbers 1 to 4 are arranged side by side at equal intervals in the right-and-left direction as in the above-described presented image.

Figure 14B:
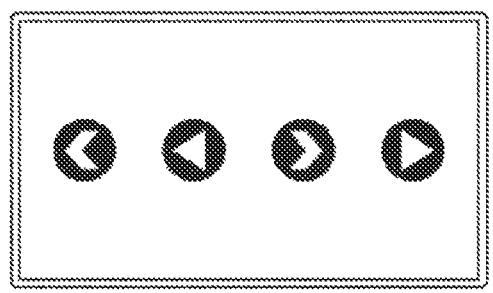

FIG. 14B illustrates a presented image in which, for example, icons used for reproduction operations for a video image, voice, and the like are arranged side by side at equal intervals in the right-and-left direction. Even if marks drawn in these icons are different, the condition for generating erroneous fusion may be satisfied.

Figure 14C:
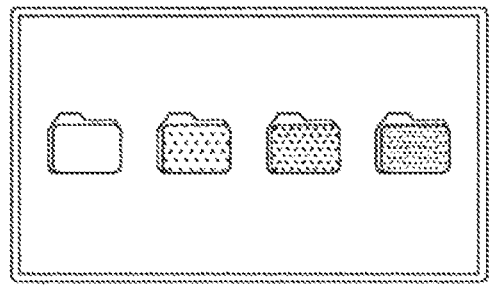

FIG. 14C illustrates a presented image in which, for example, folder-type icons used for system management for a personal computer are arranged side by side at equal intervals in the right-and-left direction. As described above, if icons have the same contour, any contour may generate erroneous fusion. Furthermore, even if colors of these icons are different, the condition for generating erroneous fusion may be satisfied.

Figure 14D:
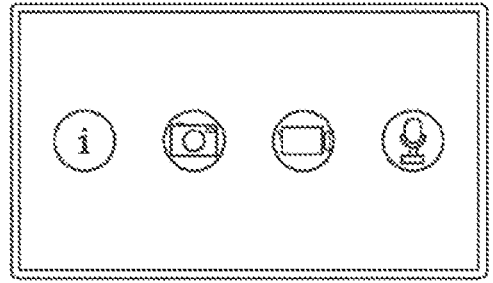

FIG. 14D illustrates a presented image in which, for example, icons for starting various applications and the like (information, camera, movie, and microphone) are arranged side by side at equal intervals in the right-and-left direction. Even if marks drawn in these icons are different, the condition for generating erroneous fusion may be satisfied.

Whether or not, for example, such various icons of a user interface easily generate erroneous fusion is determined depending on whether or not the icons are arranged side by side at equal intervals in the right-and-left direction and whether or not the icons have equivalent contours. That is, a condition for generating erroneous fusion can be set on the basis of whether or not icons are periodically arranged in a horizontal direction, whether or not an icon is made eccentric in a vertical direction, anp.

A determination method of determining whether or not a condition for generating erroneous fusion is satisfied on the basis of a horizontal period and the vertical eccentricity will be described with reference to FIGS. 15A and 15B.

Figure 15A:
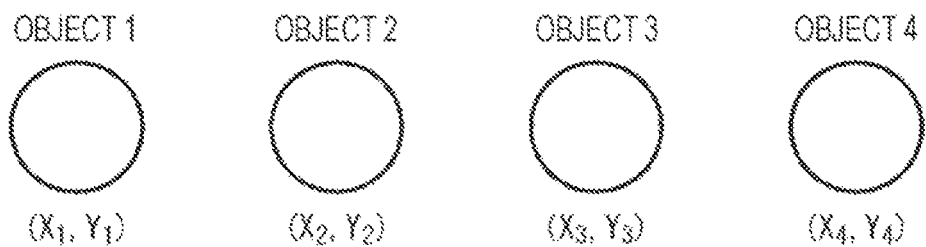
FIGS. 15A and 15B illustrate a condition for generating erroneous fusion.
Figure 15B:
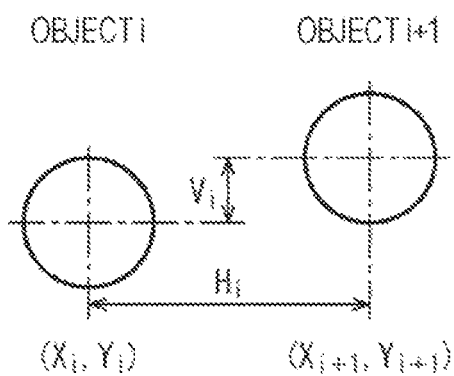

For example, as illustrated in FIG. 15A, an example in which n objects (i=1 to n, and n=4 in the example of FIGS. 15A and 15B) are arranged in the horizontal direction will be described. Furthermore, a horizontal interval Hi and a vertical interval Vi are defined as illustrated in FIG. 15B.

First, the coordinates (xi, yi) of the gravity center position of the contour of each of objects i are determined. Then, the horizontal interval Hi between the objects i adjacent in the horizontal direction is calculated in accordance with the following expression (1).

[Math 1]

$$H_i = X_{i+1} - X_i \ (i=1 + n-1) \quad \text{[Math 1]}$$

Subsequently, horizontal periodicity P is calculated in accordance with the following expression (2).

[Math 2]

$$P = \text{Max}(H_i)/\text{Min}(H_i) \ (i=1 \text{ to } n-1) \quad (2)$$

In a case where the horizontal periodicity P determined in this way is 1, the periodicity is maximized. The larger the horizontal periodicity P is, the more the periodicity collapses, and arrangement at equal intervals is not achieved. That is, in a case where the horizontal periodicity P is close to 1, it is set that a condition for generating erroneous fusion is satisfied.

Furthermore, the vertical interval $V_i$ between the objects i adjacent in the horizontal direction is calculated in accordance with the following expression (3).

[Math 3]

$$V_i Y_{i+1} - Y_i \ (i=1 \text{ to } n-1) \quad \text{[Math 3]}$$

Then, vertical eccentricity E is calculated in accordance with the following expression (4).

[Math 4]

$$E = \text{Sum}(\text{Abs}(V_1)) \ (i=1 \text{ to } n-1) \quad (4)$$

In a case where the vertical eccentricity E determined in this way is 0, there is no eccentricity. The larger the vertical eccentricity E is, the more eccentricity exists. That is, in a case where the vertical eccentricity E is close to 0 and the eccentricity amount is small, it is set that a condition for generating erroneous fusion is satisfied.

Figure 16:
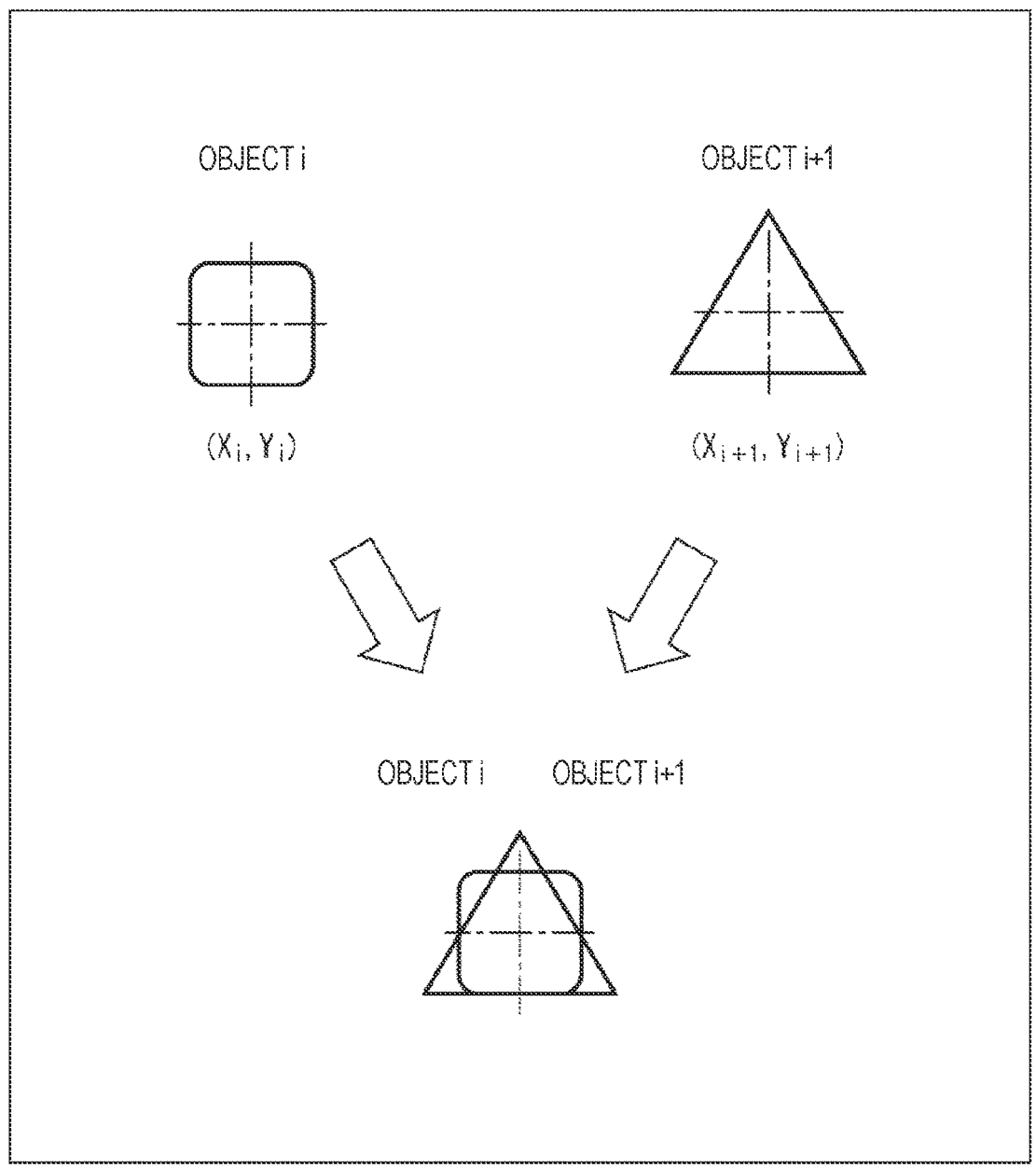
FIG. 16 illustrates the condition for generating erroneous fusion.

A determination method of determining whether or not a condition for generating erroneous fusion is satisfied on the basis of analogy of object shapes will be described with reference to FIG. 16.

First, the coordinates $(x_i, y_i)$ (i=1 to n) of the gravity center position of the contour of each object i are determined. Then, as illustrated on the lower side of FIG. 16, an object i and an object i+1 (i=1 to n−1), which are adjacent in the horizontal direction, are superimposed such that the gravity center positions of the contours of the object i and the object i+1 match each other.

In such a superimposed state, a logical sum $\text{Sor}_i$ of the projection area of the contours of the object i and the object i+1 and a logical product Sandi (i=1 to n−1) are determined. Then, shape analogy C is calculated in accordance with the following expression (5).

[Math 5]

$$C = \text{Max}(\text{Sand}_i/\text{Sor}_i) \ (i=1 \text{ to } n-1) \quad (5)$$

In a case where the shape analogy C determined in this way is 1, objects i are congruent. The smaller the shape analogy C is, the lower the analogy is. That is, in a case where the shape analogy C is close to 1 and the analogy is high, it is set that a condition for generating erroneous fusion is satisfied.

As described above, the condition for generating erroneous fusion can be set on the basis of the horizontal periodicity P, the vertical eccentricity E, and the shape analogy C, for example, by using at least one of the horizontal periodicity P, the vertical eccentricity E, and the shape analogy C.

<Configuration Example of Computer>

Next, the above-described series of processing (display control method) can be performed by hardware or software. In a case where the series of processing is performed by software, a program constituting the software is installed in, for example, a general-purpose computer.

Figure 17:
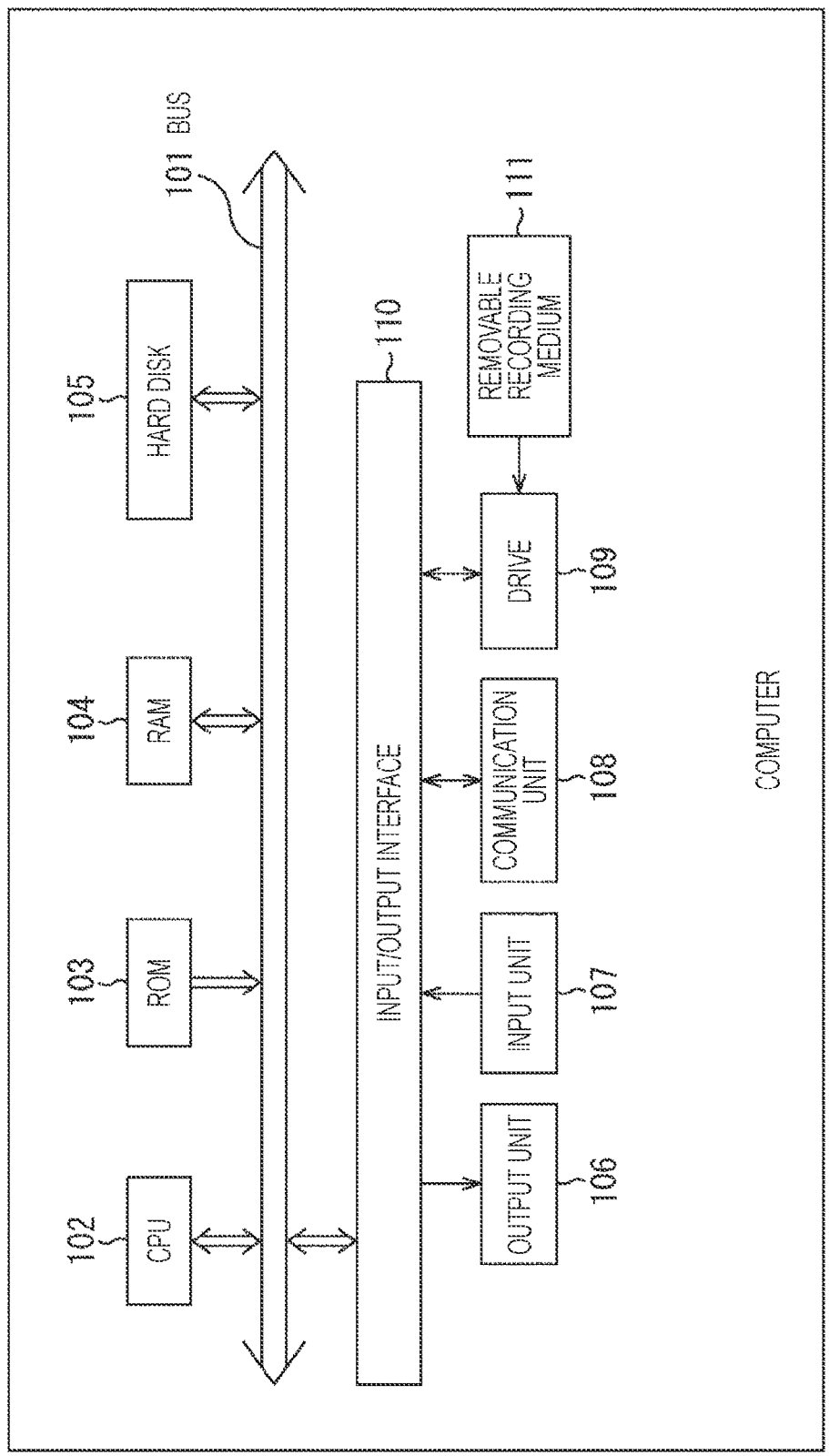
FIG. 17 is a block diagram illustrating a configuration example of one embodiment of a computer to which the present technology is applied.

FIG. 17 is a block diagram illustrating a configuration example of one embodiment of a computer to which a program for executing the above-described series of processing is installed.

The program can be prerecorded in a hard disk 105 or a ROM 103 serving as a recording medium built in the computer.

Alternatively, the program can be stored (recorded) in a removable recording medium 111 driven by a drive 109. The removable recording medium 111 as described above can be provided as so-called package software. Here, examples of the removable recording medium 111 include a flexible disc, a compact disc read only memory (CD-ROM), a Magneto optical (MO) disc, a digital versatile disc (DVD), a magnetic disc, a semiconductor memory, and the like.

Note that the program can be installed in the built-in hard disk 105 by being downloaded to a computer via a communication network or a broadcasting network in addition to being installed from the removable recording medium 111 as described above to the computer. That is, the program can be wirelessly transferred from, for example, a download site to the computer via an artificial satellite for digital satellite broadcasting, or transferred by wire to the computer via a network such as a local area network (LAN) and the Internet.

The computer has a built-in central processing unit (CPU) 102. An input/output interface 110 is connected to the CPU 102 via a bus 101.

In a case where a user inputs a command via the input/output interface 110 by, for example, operating an input unit 107, the CPU 102 executes a program stored in a read only memory (ROM) 103 in accordance with the command. Alternatively, the CPU 102 loads a program stored in the hard disk 105 into a random access memory (RAM) 104, and executes the program.

With these operations, the CPU 102 performs processing in accordance with the above-described flowchart or processing performed in accordance with the above-described configuration in the block diagram. Then, the CPU 102 outputs the processing result from an output unit 106, or transmits the processing result from a communication unit 108, and, for example, records the processing result in the hard disk 105 via, for example, the input/output interface 110 as necessary.

Note that the input unit 107 includes, for example, a keyboard, a mouse, and a microphone. Furthermore, the output unit 106 includes, for example, a liquid crystal display (LCD) and a speaker.

Here, in the present specification, processing performed by a computer in accordance with a program is not necessarily required to be performed in time series in the order described in the flowchart. That is, processing performed by a computer in accordance with a program also includes processing executed in parallel or individually (e.g., parallel processing or processing by using an object).

Furthermore, the program may be processed by one computer (processor), or may be processed in a distributed manner by a plurality of computers. Moreover, the program may be transferred to a distant computer to be executed.

Moreover, in the specification, a system means a collection of a plurality of components (e.g., devices and modules (parts)), and it does not matter whether or not all the components are in the same housing. Consequently, both of a plurality of devices accommodated in different housings and connected via a network, and one device having a plurality of modules accommodated in one housing are systems.

Furthermore, for example, a configuration described as one device (or a processing unit) may be divided into a plurality of devices (or processing units). In contrast, a configuration described as a plurality of devices (or processing units) in the above description may be put into one device (or a processing unit). Furthermore, of course, a configuration other than the above-described configurations may be added to the configuration of each device (or each processing unit). Furthermore, a part of the configuration of a certain device (or a processing unit) may be included in the configuration of another device (or another processing unit) as long as the configuration and operation of the system as a whole are substantially the same.

Furthermore, for example, the present technology can have a configuration of cloud computing in which a plurality of devices shares one function via a network and performs processing together.

Furthermore, for example, the above-described program can be executed in any device. In that case, that device is only required to have a necessary function (e.g., function block) to obtain necessary information.

Furthermore, in addition to being executed by one device, each step described in the above-described flowchart can be shared and executed by a plurality of devices, for example. Moreover, in a case where one step includes a plurality of pieces of processing, the plurality of pieces of processing included in that one step can be shared and executed by a plurality of devices in addition to being executed by one device. In other words, a plurality of pieces of processing included in one step can be executed as pieces of processing of a plurality of steps. Conversely, pieces of processing described as a plurality of steps can be collectively executed as one step.

Note that, in a program executed by a computer, pieces of processing of steps describing the program may be executed in time series in the order described in the specification, or may be separately executed in parallel at necessary timing when, for example, calling is performed. That is, as long as inconsistency does not arise, the processing of each step may be executed in an order different from the above-described order. Moreover, the processing of the step describing this program may be executed in parallel with the processing of another program, or may be executed in combination with the processing of another program.

Note that, each of the plurality of present technologies described in the specification can be independently performed alone as long as inconsistency does not arise. Of course, an optional plurality of present technologies can be implemented together. For example, a part or all of the present technology described in one of the embodiments can be implemented in combination with a part or all of the present technology described in the other embodiment. Furthermore, a part or all of any of the above-described present technologies can be implemented together with other technologies that are not described above.

<Examples of Combination of Configuration>

Note that the present technology can also have the configurations as follows.

(1)

A display control device including:

an erroneous fusion determination unit that determines whether or not a condition for generating erroneous fusion on a presented image is satisfied on the basis of a display mode of a plurality of display objects arranged side by side in one direction on the presented image at a time of displaying the presented image presented in three-dimensional space, the presented image being expressed by two images for stereoscopic viewing by using fusion in which the two images are superimposed and recognized as one image; and a display effect control unit that performs control of applying a predetermined effect to display of the presented image on the basis of a determination result.

(2)

The display control device according to (1), in which the erroneous fusion determination unit performs determination by using, as a display mode of the plurality of display objects, at least one of periodicity of intervals in a case where the plurality of display objects is arranged in the one direction, an eccentricity amount in a case where at least one of the plurality of display objects is made eccentric in a direction orthogonal to the one direction, and analogy of shapes of the plurality of display objects.

(3)

The display control device according to (2), in which, in a case of high periodicity, a small eccentricity amount, and high analogy, the erroneous fusion determination unit determines that a condition for generating erroneous fusion on the presented image is satisfied.

(4)

The display control device according to (3), in which, in a case where it is determined, on the basis of a display mode of the plurality of display objects, that a condition for generating erroneous fusion on the presented image is satisfied, and a presentation distance to the presented image is equal to or less than a predetermined reference distance, the erroneous fusion determination unit determines that the condition for generating erroneous fusion on the presented image is satisfied.

(5)

The display control device according to any one of (1) to (4), in which the display effect control unit performs control of applying the effect that changes display of display objects and that displays the display objects in from a second display mode to a first display mode, the second display mode being different from the first display mode in which the plurality of display objects is displayed in an original mode.

(6)

The display control device according to (5), in which the display effect control unit performs control of applying the effect that rotationally moves the plurality of display objects so that shift is performed from the second display mode to the first display mode, display being performed in the second display mode in an arrangement in which all of the plurality of display objects are aligned in a direction different from the one direction, display being performed in the first display mode in an arrangement in which all of the plurality of display objects are aligned in the one direction.

(7)

The display control device according to (5), in which the display effect control unit performs control of applying the effect that moves at least one of the display objects so that shift is performed from the second display mode to the first display mode, display being performed in the second display mode in an arrangement in which at least one of the plurality of display objects is made eccentric in a direction orthogonal to the one direction, display being performed in the first display mode in an arrangement in which all of the plurality of display objects are aligned in the one direction.

(8)

The display control device according to (5), in which the display effect control unit performs control of applying the effect that moves at least one of the display objects so that shift is performed from the second display mode to the first display mode, at least one of the plurality of display objects being displayed in an arrangement in which the plurality of display objects is placed at unequal intervals in the one direction, display being performed in an arrangement in which all of the plurality of display objects are placed at equal intervals in the one direction.

(9)

The display control device according to (5), in which the display effect control unit performs control of applying the effect that continuously changes a luminance of at least one of the plurality of display objects and displays the at least one of the plurality of display objects at from a luminance of the second display mode to a luminance of the first display mode, the second display mode being different from the first display mode in which display is performed at an original luminance.

(10)

The display control device according to (5), in which the display effect control unit performs control of applying the effect that continuously changes a size of at least one of the plurality of display objects and displays the at least one of the plurality of display objects at from a size of the second display mode to a size of the first display mode, the second display mode being different from the first display mode in which display is performed at an original size.

(11)

The display control device according to any one of (1) to (10), in which the display effect control unit performs control of applying the effect that hides an additional image and allows display in from a second display mode to a first display mode, the additional image being displayed at a predetermined position where the two images are superimposed at a time of being fused in the second display mode in addition to the first display mode in which there is the plurality of display objects originally displayed on the presented image.

(12)

The display control device according to any one of (1) to (11), in which the display effect control unit performs control of applying the effect that allows:

display in a second display mode at a time when display of the presented image is started, the second display mode being different from a first display mode in which original display of the plurality of display objects is performed, and display in the first display mode at a time when a certain period of time has elapsed since start of display in the second display mode.

(13)

The display control device according to any one of (1) to (12), further including an eye-tracking unit that measures a line-of-sight, in which the display effect control unit performs control of applying the effect on the basis of an angle of convergence between right and left eyes determined by measurement with the eye-tracking unit, the effect allowing:

display in a second display mode in a case where the presented image is determined not to be a correctly fused image, the second display mode being different from the first display mode in which original display of the plurality of display objects is performed; and display in from the second display mode to the first display mode in a case where the presented image is determined to be obtained by correct fusion during display in the second display mode.

(14)

The display control device according to any one of (1) to (13), in which the two images for stereoscopic viewing are an image for a right eye and an image for a left eye displayed on a display unit of a head-mounted display worn so as to cover a field of view of a user, and the one direction corresponds to a right-and-left direction in the field of view of the user.

(15)

The display control device according to (14), further including:

a presented image generation unit that generates the presented image displayed by the image for a right eye and the image for a left eye on the basis of display information for displaying the plurality of display objects arranged in the presented image; and an image composition unit that combines the presented image with a background image that is to be a background.

(16)

A display control method including:

a display control device that controls display of two images for stereoscopic viewing:

determining whether or not a condition for generating erroneous fusion on a presented image is satisfied on the basis of a display mode of a plurality of display objects arranged side by side in one direction on the presented image at a time of displaying the presented image presented in three-dimensional space, the presented image being expressed by the two images by using fusion in which the two images are superimposed and recognized as one image; and performing control of applying a predetermined effect to display of the presented image on the basis of a determination result.

(17)

A recording medium in which a program causing a computer of a display control device that controls display of two images for stereoscopic viewing to execute processing is recorded, the processing including:

determining whether or not a condition for generating erroneous fusion on a presented image is satisfied on the basis of a display mode of a plurality of display objects arranged side by side in one direction on the presented image at a time of displaying the presented image presented in three-dimensional space, the presented image being expressed by the two images by using fusion in which the two images are superimposed and recognized as one image; and performing control of applying a predetermined effect to display of the presented image on the basis of a determination result.

Note that, the present embodiments are not limited to the above-described embodiments, and various modifications are possible without departing from the spirit of the disclosure. Furthermore, the effects described in the specification are merely examples, and are not limitations. Other effects may be exhibited.

REFERENCE SIGNS LIST

11 Head-mounted display
21 Stereoscopic display system
22 Image display application
23 Display control device
31 Storage unit
32 Presented image generation unit
33 Erroneous fusion determination unit
34 Display effect unit
35 Image composition unit
41 Display unit
42 Eye-tracking unit

The invention claimed is:

1. A display control device, comprising:

an erroneous fusion determination unit configured to determine whether a condition for generating erroneous fusion on a presented image is satisfied on a display mode of a plurality of display objects arranged side by side in one direction on the presented image at a time of displaying the presented image presented in three-dimensional space, the presented image being expressed by two images for stereoscopic viewing by using fusion in which the two images are superimposed and recognized as one image; and a display effect control unit configured to perform control of applying a predetermined effect to display of the presented image based on a determination result.

2. The display control device according to claim 1, wherein the erroneous fusion determination unit is further configured to perform the determination by using, as the display mode of the plurality of display objects, at least one of periodicity of intervals in a case where the plurality of display objects is arranged in the one direction, an eccentricity amount in a case where at least one of the plurality of display objects is made eccentric in a direction orthogonal to the one direction, and analogy of shapes of the plurality of display objects.

3. The display control device according to claim 2, wherein, in a case of high periodicity, a small eccentricity amount, and high analogy, the erroneous fusion determination unit is further configured to determine that the condition for generating the erroneous fusion on the presented image is satisfied.

4. The display control device according to claim 3, wherein, in a case where it is determined, based on the display mode of the plurality of display objects, that the condition for generating the erroneous fusion on the presented image is satisfied, and a presentation distance to the presented image is equal to or less than a predetermined reference distance, the erroneous fusion determination unit is further configured to determine that the condition for generating the erroneous fusion on the presented image is satisfied.

5. The display control device according to claim 1, wherein the display effect control unit is further configured to perform the control of applying the predetermined effect that changes display of display objects and that displays the display objects in from a second display mode to a first display mode, the second display mode being different from the first display mode in which the plurality of display objects is displayed in an original mode.

6. The display control device according to claim 5, wherein the display effect control unit is further configured to perform the control of applying the predetermined effect that rotationally moves the plurality of display objects so that shift is performed from the second display mode to the first display mode, display being performed in the second display mode in an arrangement in which all of the plurality of display objects are aligned in a direction different from the one direction, display being performed in the first display mode in an arrangement in which all of the plurality of display objects are aligned in the one direction.

7. The display control device according to claim 5, wherein the display effect control unit is further configured to perform the control of applying the predetermined effect that moves at least one of the display objects so that shift is performed from the second display mode to the first display mode, display being performed in the second display mode in an arrangement in which at least one of the plurality of display objects is made eccentric in a direction orthogonal to the one direction, display being performed in the first display mode in an arrangement in which all of the plurality of display objects are aligned in the one direction.

8. The display control device according to claim 5, wherein the display effect control unit is further configured to perform the control of applying the predetermined effect that moves at least one of the display objects so that shift is performed from the second display mode to the first display mode, at least one of the plurality of display objects being displayed in an arrangement in which the plurality of display objects is placed at unequal intervals in the one direction, display being performed in an arrangement in which all of the plurality of display objects are placed at equal intervals in the one direction.

9. The display control device according to claim 5, wherein the display effect control unit is further configured to perform the control of applying the predetermined effect that continuously changes a luminance of at least one of the plurality of display objects and displays the at least one of the plurality of display objects at from a luminance of the second display mode to a luminance of the first display mode, the second display mode being different from the first display mode in which display is performed at an original luminance.

10. The display control device according to claim 5, wherein the display effect control unit is further configured to perform the control of applying the predetermined effect that continuously changes a size of at least one of the plurality of display objects and displays the at least one of the plurality of display objects at from a size of the second display mode to a size of the first display mode, the second display mode being different from the first display mode in which display is performed at an original size.

11. The display control device according to claim 1, wherein the display effect control unit is further to perform the control of applying the predetermined effect that hides an additional image and allows display in from a second display mode to a first display mode, the additional image being displayed at a predetermined position where the two images are superimposed at a time of being fused in the second display mode in addition to the first display mode in which there is the plurality of display objects originally displayed on the presented image.

12. The display control device according to claim 1, wherein the display effect control unit is further configured to perform the control of applying the predetermined effect that allows:
display in a second display mode at a time when the display of the presented image is started, the second display mode being different from a first display mode in which original display of the plurality of display objects is performed, and
display in the first display mode at a time when a certain period of time has elapsed since the start of the display in the second display mode.

13. The display control device according to claim 1, further comprising an eye-tracking unit configured to measure a line-of-sight,
wherein the display effect control unit is further configured to perform the control of applying the predetermined effect based on an angle of convergence between right and left eyes determined by measurement with the eye-tracking unit, the predetermined effect allowing:
display in a second display mode in a case where the presented image is determined not to be a correctly fused image, the second display mode being different from a first display mode in which original display of the plurality of display objects is performed; and
display in from the second display mode to the first display mode in a case where the presented image is determined to be obtained by correct fusion during the display in the second the display mode.

14. The display control device according to claim 1, wherein the two images for the stereoscopic viewing are an image for a right eye and an image for a left eye displayed on a display unit of a head-mounted display worn so as to cover a field of view of a user, and
the one direction corresponds to a right-and-left direction in the field of view of the user.

15. The display control device according to claim 14, further comprising:
a presented image generation unit configured to generate the presented image displayed by the image for the right eye and a image for a left eye based on display information for displaying the plurality of display objects arranged in the presented image; and
an image composition unit configured to combine the presented image with a background image that is to be a background.

16. A display control method, comprising:
in a display control device that controls display of two images for stereoscopic viewing:
determining whether a condition for generating erroneous fusion on a presented image is satisfied based on a display mode of a plurality of display objects arranged side by side in one direction on the presented image at a time of displaying the presented image presented in three-dimensional space, the presented image being expressed by the two images for the stereoscopic viewing by using fusion in which the two images are superimposed and recognized as one image; and
performing control of applying a predetermined effect to display of the presented image based on a determination result.

17. A recording medium in which a program causing a computer of a display control device that controls display of two images for stereoscopic viewing to execute processing is recorded, the processing including:

determining whether a condition for generating erroneous fusion on a presented image is satisfied based on a display mode of a plurality of display objects arranged side by side in one direction on the presented image at a time of displaying the presented image presented in three-dimensional space, the presented image being expressed by the two images by using fusion in which the two images are superimposed and recognized as one image; and performing control of applying a predetermined effect to display of the presented image based on a determination result.

\* \* \* \* \*